United States Patent [19]
Schrey et al.

[11] Patent Number: 5,692,488
[45] Date of Patent: Dec. 2, 1997

[54] METHOD FOR AUTOMATIC CALIBRATION OF AN ANGLE MARK TRANSMITTER AT THE CRANKSHAFT OF AN INTERNAL COMBUSTION ENGINE

[75] Inventors: Ing Ekkehard Schrey; Ing Guenter Schmitz, both of Aachen, Germany

[73] Assignee: FEV Motorentechnik GmbH & Co. KG, Aachen, Germany

[21] Appl. No.: 708,688

[22] Filed: Sep. 5, 1996

[30] Foreign Application Priority Data

Sep. 20, 1995 [DE] Germany ............... 19534878.8

[51] Int. Cl.⁶ .................................................. F01L 9/04
[52] U.S. Cl. .................... 123/672; 73/117.3; 123/90.11
[58] Field of Search ..................... 123/90.11, 90.15, 123/90.17, 414, 617, 672; 73/116, 117.2, 117.3, 118.1

[56] References Cited

U.S. PATENT DOCUMENTS

| | | | |
|---|---|---|---|
| 4,957,074 | 9/1990 | Weissler, III et al. | 123/90.11 |
| 5,289,805 | 3/1994 | Quinn, Jr. et al. | 123/90.11 X |
| 5,321,979 | 6/1994 | McKendry et al. | 73/117.3 |
| 5,417,187 | 5/1995 | Meyer et al. | 123/90.17 |
| 5,522,352 | 6/1996 | Adachi et al. | 123/90.17 X |

FOREIGN PATENT DOCUMENTS 3024109  1/1982  Germany.

Primary Examiner—Tony M. Argenbright
Attorney, Agent, or Firm—Spencer & Frank

[57] ABSTRACT

A method is provided for automatic calibration of an angle mark transmitter at the crankshaft of an internal combustion engine having fuel injection, Lambda sensor control and electromagnetically actuated gas cylinder valves. The control time "intake closes" is initially adjusted for all gas cylinder valves to a preliminary value. For defined marginal operating conditions, in particular speed and temperature, the control time "intake closes" for at least one gas cylinder valve is changed to determine, via the Lambda sensor control at Lambda=1, a value at which the longest fuel injection time is detected or, for a constant injection time, the leanest operation is detected. The determined control time is compared to the desired control time for an exactly adjusted angle mark transmitter on the internal combustion engine and in case of deviation is compensated for in the control for the internal combustion engine.

1 Claim, 2 Drawing Sheets

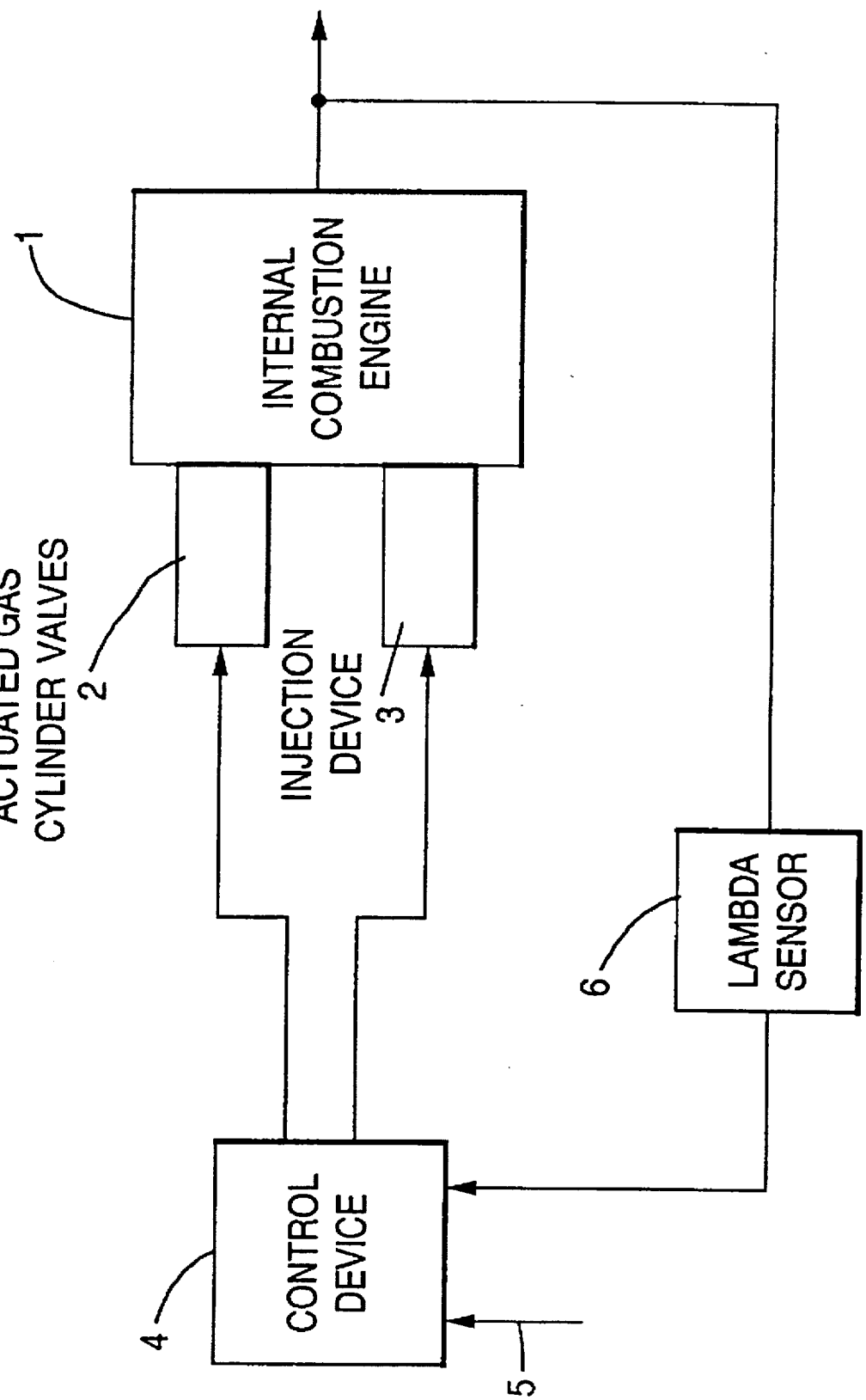

METHOD FOR AUTOMATIC CALIBRATION OF AN ANGLE MARK TRANSMITTER AT THE CRANKSHAFT OF AN INTERNAL COMBUSTION ENGINE

BACKGROUND OF THE INVENTION

Electromagnetically actuated gas cylinder valves are known, for example, from German Patent No. 3,024,109, wherein a fully variable electromagnetic actuator is allocated to each cylinder valve, so that in each case, the opening and closing times, and thus also the opening and closing interval are brought about by a corresponding control of the electromagnetic actuators. Internal combustion engines of this type are, as a rule, equipped with fuel injection and have an exhaust gas sensor for regulating the fuel/air ratio.

The exhaust gas sensor for regulation of the fuel/air ratio may be a so-called "lean sensor" or a continuously operating Lambda sensor. A "lean sensor", according to the invention, is a sensor which emits an output signal that can be used to provide information on the stoichiometric ratio of mixture between air and fuel and thus also the "leanness" of the fuel/air ratio. To a certain extent, a so-called "lean sensor" can also be used in a range for rich mixtures.

The lean sensor can also be a traditional Lambda sensor control where the injection time for the air ratio λ=1 is regulated through use of so-called "skip sensors." The term "Lambda sensor control" in the sense of the invention at hand applies to an operation with a lean sensor and with a conventional Lambda sensor.

In an internal combustion engine, a knowledge of the exact crankshaft position is a precondition for an exact actuation of the electromagnetic actuators for the gas cylinder valves, as well as other actuators triggered by electric signals, for which the operating mode depends on the crankshaft position. Corresponding angle mark transmitters are attached to the crankshaft to determine the crankshaft position and are designed as incremental transmitters. In addition to the "zero signal," which is generally the signal for the crankshaft position at the bottom dead center (BDC), the angle mark transmitters supply an additional signal for displaying a reference angle.

The angle mark transmitters must be mounted with a corresponding accuracy on the crankshaft during manufacture of the internal combustion engine as well as during repairs. A problem results in that for internal combustion engines with the latest precision control elements, in particular with electromagnetically actuated gas cylinder valves, the angle mark transmitter must be mounted with an extremely high degree of accuracy, as the maximum deviation that can be tolerated is only about 0.2° KW (crank angle). However, achieving a high degree of mounting accuracy presents a problem.

In an internal combustion engine, the greatest charge for a cylinder, with the exception of special cases such as the charging and so forth, is always a given if the piston is approximately at the bottom dead center and the gas intake valve closes while the gas exhaust valve is still closed. Under these circumstance, the angle mark transmitter may by calibrated by detecting the maximum charge of one or all of the cylinders of an internal combustion engine and to compensate for a deviation of the angle mark transmitter at the "BDC position" from the actual BDC position of the crankshaft. This calibration can then be taken into account for the actuation of the gas cylinder valves and other actuators, which depend on the position of the crankshaft.

SUMMARY OF THE INVENTION

It is therefore an object of the invention to electronically detect deviations of the angle mark transmitter from the bottom dead center position of the crankshaft to provide an electronic compensation therefor in controlling the electromagnetic actuators for the cylinder valves and other actuators that depend on the position of the crankshaft.

The above and other objects are accomplished in accordance with the invention by the provision of a method for automatic calibration of an angle mark transmitter at a crankshaft of an internal combustion engine provided with fuel injection, Lambda sensor control and electromagnetically actuated gas cylinder valves, wherein the cylinder valves each include at least an "intake closes" control time, comprising the steps of: initially adjusting the "intake closes" control time for all gas cylinder valves to a preliminary value; determining an actual "intake closes" control time for a maximum charge of a cylinder by changing the "intake closes" control time of respective cylinder valve while maintaining defined marginal operating conditions for at least a particular speed and temperature until, with the Lambda sensor control at Lambda=1, detecting one of (1) a longest fuel injection time and (2) a leanest operation while maintaining a constant injection time; comparing the actual "intake closes" control time to a desired "intake closes" control time for an exactly adjusted angle mark transmitter of the internal combustion engine; and compensating the mark transmitter based on any deviation that occurs between the actual and desired "intake closes" control times.

The invention takes advantage of the fact that in an internal combustion engine provided with fuel injection, Lambda sensor control, and electromagnetically actuated gas cylinder valves regulated by a control having performance characteristics stored in a memory for the valve control times, it is possible to determine the respective maximum charge of the cylinders, independent of an exact setting of the angle mark transmitter. In doing so, use is made of the fact that the "intake closes" control time has the greatest influence on the maximum cylinder charge. In order to determine the maximum cylinder charge, the "intake closes" control time on all gas cylinder valves of the internal combustion engine are initially adjusted to a preliminary, advisably equal value. Subsequently, the "intake closes" control time is changed continuously on at least one cylinder, while the rpm of the engine remains constant, until either the longest fuel injection time (which is proportional to the quantity of fuel injected) or, with a constant injection time, the leanest operation, is detected by the Lambda sensor control for Lambda=1. The "intake closes" control time is thus determined for a maximum cylinder charge at each speed and stored in the performance characteristics for the motor control.

If the angle mark transmitter is mounted approximately in the correct position, with respect to the "BDC Position," then, starting with the control data stored in the performance characteristics for the maximum cylinder charge with activated Lambda sensor control and constant speed, the deviation for the control times between the actual BDC position provided by the detection of the maximum cylinder charge and the signal "BDC Position" emitted by the angle mark transmitter can be determined, and this deviation can be recorded in the control device and thus also compensated for.

The method of the invention is explained below in greater detail in conjunction with the accompanying drawings.

BRIEF DESCRIPTION OF THE DRAWINGS

FIG. 2 is a block diagram of a circuit for implementing the method of the invention.

DETAILED DESCRIPTION OF THE PREFERRED EMBODIMENTS

Figure 1A:
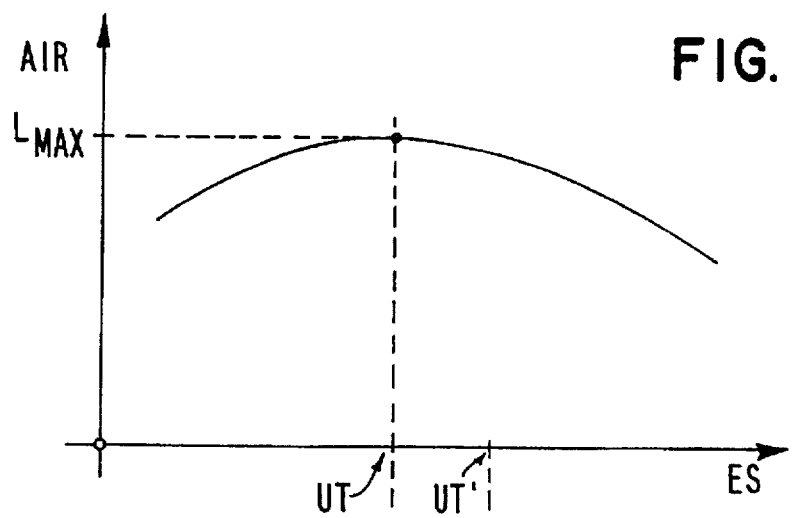
FIG. 1a is graph showing the measured dependence of the amount of air in a cylinder on the "intake closes" control time for Lambda=1.

Referring to FIG. 1a, there is shown a graph that displays the amount of air in a cylinder in dependence on the "intake closes" control time ES. It is discernible here that the maximum air volume $L_{max}$ in the cylinder exists if the gas intake valve closes at a point in time UT when the piston in the respective cylinder has reached the bottom dead center.

Figure 1B:
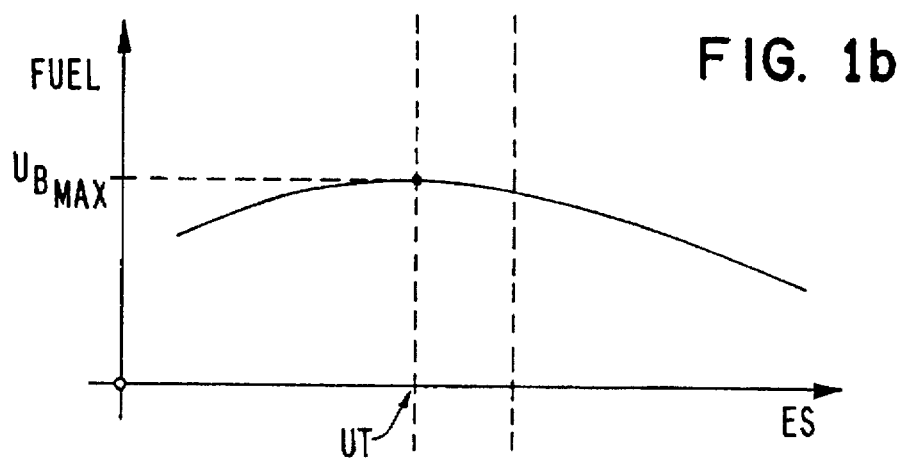
FIG. 1b is a graph showing the dependence of the associated fuel amount on the "intake closes" control time for Lambda=1.

If the fuel amount is controlled as a function of the Lambda sensor control such that the condition λ=1 is always maintained, then the time UT at which the gas intake valve must be closed to achieve the maximum charge $U_{Bmax}$ in the cylinder may be determined from the longest, determined injection time, which is proportional to the maximum injected fuel amount, as is shown in FIG. 1b. The maximum for both curves is coordinated in each case with the control parameter ES, meaning "intake closes," when the crankshaft for the respective cylinder piston has actually reached the BDC position.

Figure 1C:
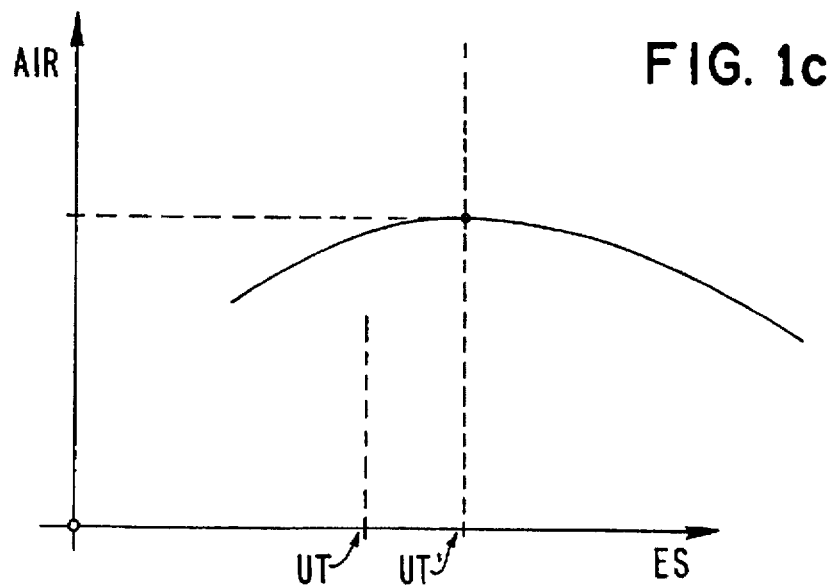
FIG. 1c is a graph showing a typical progression of air depending on the "intake closes" control time for an internal combustion engine.

FIG. 1c shows a typical progression of the air and fuel amount in dependence on the "intake closes" control time for the internal combustion engine represented by FIGS. 1a and 1b with the assumption that the angle mark transmitter has been mounted with precision. The maximum charge of the cylinder occurs at "intake closes" control time UT'. The time difference between the maximum for the actual curve shown in FIGS. 1a and 1b and the maximum for the typical curve shown in FIG. 1c corresponds to the mounting difference. The deviation thus determined can then be detected and taken into account accordingly for the purpose of calibrating the control equipment.

FIG. 2 shows a block diagram of an arrangement for detecting the maximum charge in dependence on the "intake closes" control time. An internal combustion engine 1 is equipped with fully variable, electromagnetically actuated gas cylinder valves 2 and an injection device 3, wherein, although not shown, a separate injection device is allocated to each cylinder.

The gas cylinder valves, that is, the gas intake valves and the gas exhaust valves, are actuated by a control device 4, which is supplied with other operating parameters (desired load, speed, temperature, etc.) for normal operation as represented by arrow 5.

Control device 4 in this case has a memory storing the performance characteristics which indicate the control times for the gas cylinder valves and for the injection device for all operational speeds or operational speed ranges. It is thus possible to program the performance characteristics stored in the memory so that for each speed or each speed range, the "intake closes" control time is preset such that a maximum charge of the cylinder and thus a maximum torque is always available. This is accomplished by superimposing Lambda control 6 onto control equipment 4.

To determine a maximum charge for a cylinder, all cylinders for the internal combustion engine are initially adjusted to the same "intake closes" control time. The "intake closes" control time is then changed via the control device while, at the same time, the injection time for injection device 3 is detected. The "intake closes" control time can be detected for an optimum charge at a predetermined speed, in connection with a regulation of injection device 3 in dependence on Lambda sensor control 6. The "intake closes" control time determined in this way is stored with the performance characteristics in the memory of control device 4.

This method is carried out in accordance with the predetermined performance characteristics for the entire speed range of the motor. This procedure can be executed for the motor on the whole, or for each individual cylinder respectively, which are then "run down" one after another in this way. These performance characteristics are then referred to during the actual driving.

In order to be able to determine the deviation between the signal from the angle mark transmitter "BDC position" and the actual "BDC position" of the crankshaft, all cylinders of the internal combustion engine are initially adjusted to have the same "intake closes" control time. The internal combustion engine is then driven at a constant speed, and the "intake closes" control time is changed continuously via the control device while, at the same time, the injection time for the injection device 3 is detected. Then, the respective "intake closes" control time for the maximum cylinder charging and thus also the corresponding actual "BDC position" of the crankshaft is determined for the predetermined speed, in connection with an adjustment of the injection device 3 in dependence on the Lambda sensor control 6. The same process takes place if the Lambda sensor control operates on the basis of a lean sensor.

Based on a deviation between the actually measured, maximum charge amount and the typical progression for the internal combustion engine with respect to the "intake closes" control time, it is possible to deduce the deviation between the BDC position indicated by the angle mark transmitter signal and the actual "BDC position" of the crankshaft and to provide compensation in the control device for controlling the actuators that are dependent on the BDC position of the crankshaft.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A method for automatic calibration of an angle mark transmitter at a crankshaft of an internal combustion engine provided with fuel injection, Lambda sensor control and electromagnetically actuated gas cylinder valves, wherein the cylinder valves each include at least an "intake closes" control time, comprising the steps of:

initially adjusting the "intake closes" control time for all gas cylinder valves to a preliminary value;

determining an actual "intake closes" control time for a maximum charge of a cylinder by changing the "intake closes" control time of respective cylinder valve while maintaining defined marginal operating conditions for at least a particular speed and temperature until, with the Lambda sensor control at Lambda=1, detecting one of (1) a longest fuel injection time and (2) a leanest operation while maintaining a constant injection time;

comparing the actual "intake closes" control time to a desired "intake closes" control time for an exactly adjusted angle mark transmitter of the internal combustion engine; and compensating the mark transmitter based on any deviation that occurs between the actual and desired "intake closes" control times.

* * * * *